J. HAMMEL.
VEHICLE BODY.
APPLICATION FILED APR. 9, 1913.

1,090,849.

Patented Mar. 24, 1914.

2 SHEETS—SHEET 1.

Witnesses
H. L. Richey
Gertrude M. Verner

Inventor
John Hammel
By John A. Bommhardt
Attorney

J. HAMMEL.
VEHICLE BODY.
APPLICATION FILED APR. 9, 1913.

1,090,849.

Patented Mar. 24, 1914.

2 SHEETS—SHEET 2.

Witnesses
H. L. Richey
Gertrude M. Werner.

Inventor
John Hammel
By John A. Bommhardt
Attorney

UNITED STATES PATENT OFFICE.

JOHN HAMMEL, OF CLEVELAND, OHIO.

VEHICLE-BODY.

1,090,849.  Specification of Letters Patent.  Patented Mar. 24, 1914.

Application filed April 9, 1913. Serial No. 759,855.

*To all whom it may concern:*

Be it known that I, JOHN HAMMEL, a subject of the Emperor of Austria-Hungary, residing at Cleveland, in the county of Cuyahoga and State of Ohio, have invented certain new and useful Improvements in Vehicle-Bodies, of which the following is a specification.

This invention relates to vehicle bodies, and especially to removable bodies which may be attached to or detached from the frame of a motor vehicle or the like, whereby the vehicle may be used to carry passengers, or, by removal of parts of the body, may be used as a wagon or truck for delivery purposes or the like.

The rear part of the body is made in two side and one rear sections, which are detachable and removable.

The improvements extend to the means for rigidly holding the detachable body sections in position on the frame.

Figure 1:
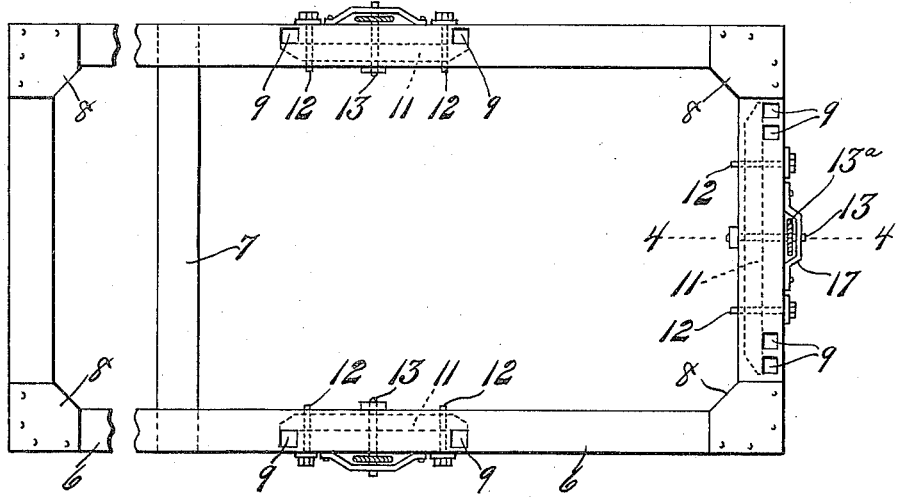
Figure 2:
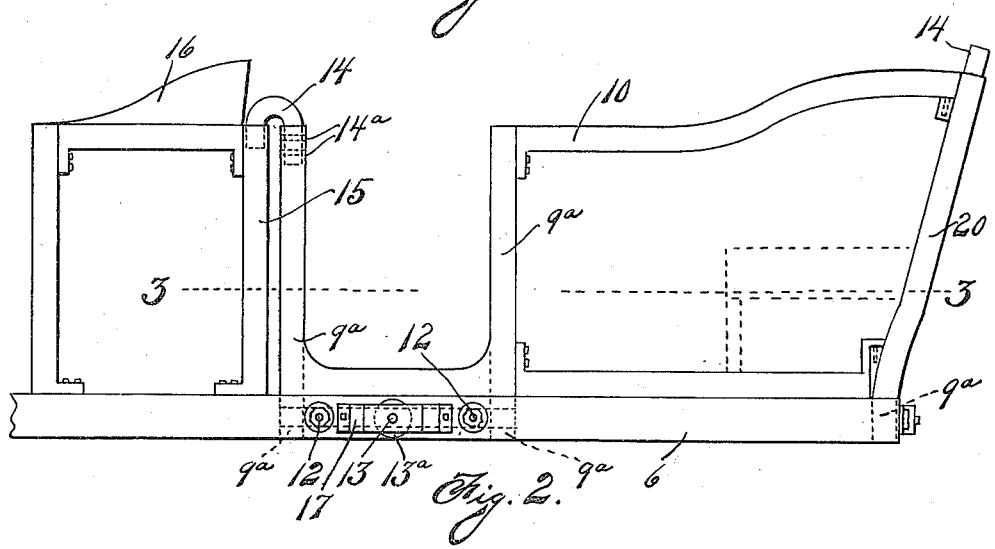
Figure 3:
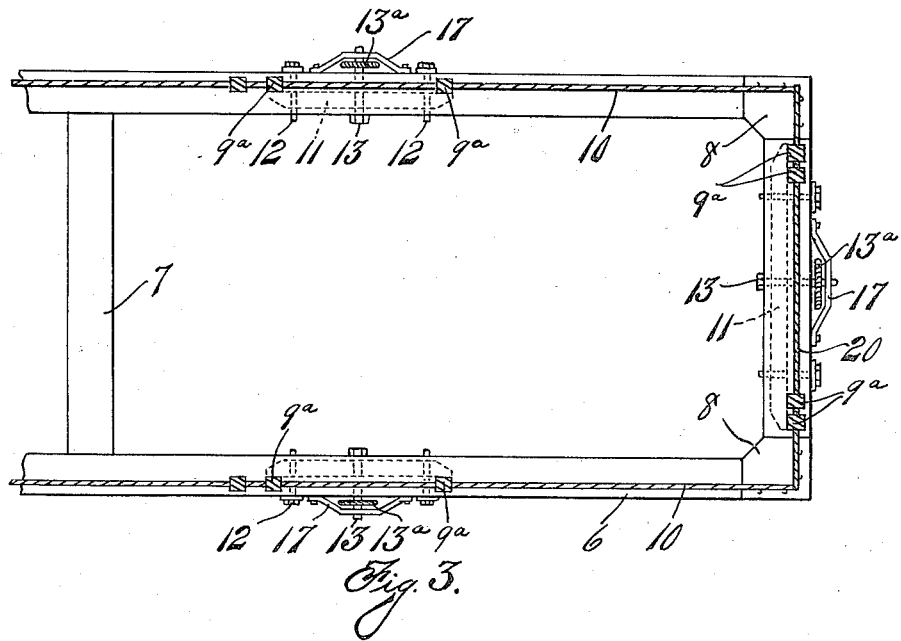
Figure 4:
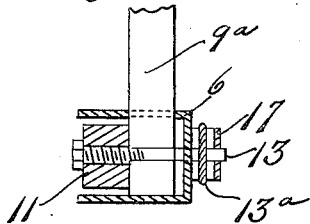

In the accompanying drawings—Figure 1 is a top plan view of the frame or chassis. Fig. 2 is a side view with the removable sections in place. Fig. 3 is a horizontal section on the line 3—3 of Fig. 2. Fig. 4 is a vertical section on the line 4—4 of Fig. 1.

Referring specifically to the drawings, 6 indicates the base frame or chassis, with one or more cross pieces 7 and corner plates 8 to hold the parts of the frame together. The rear bar and the two side bars of the frame are provided with sockets 9 to receive the lower ends of the posts $9^a$ which support the removable side body sections 10 and the rear body section 20. The posts $9^a$ of the side sections are preferably located at each side of the doorway, and the front post has at its upper end a curved or hooked piece or part 14 which is secured to the post by bolts $14^a$ and which engages at its upper end in a socket in the top of a post 15 which supports the front seat 16 and which is secured to the side sill 6. This curved connection between the two posts assists in holding the removable side sections 10 in proper position on the frame. The rear body section 20 is connected to the side body sections 10 in the same manner—viz: the two end posts of the rear body section 20 have at their upper end the curved or hooked pieces 14, which fit in the sockets of the posts $9^a$ of said side body sections, and are secured to the posts by means of bolts, thereby providing a rigid connection between the rear body section 20 and the side body section 10. The posts $9^a$ which fit in the sockets 9 are held in place by means of bars 11 located in recesses in the frames 6 and guided by bolts 12 extending through said bars and through the frames. These clamping bars 11 are drawn against the lower ends of the posts $9^a$ by means of clamping bolts 13, with nuts $13^a$ which screw thereon, the nuts being covered or protected by straps 17 fastened to the sides or sills of the frame. When the bolts 13 are drawn up the clamping bars 11 bind against the lower ends of the posts $9^a$ and hold them firmly in the sockets 9. By loosening the bolts, the side and end sections 10 and 20 may be readily lifted and detached, leaving a flat platform or permitting the attachment of the sides of a wagon body or the like, or the substitution of wagon stakes, according to the purpose for which the wagon or truck is to be used.

The removable sides and back are preferably made of metal and the back section will carry a rear seat for passenger use.

By the means shown the attachment or detachment of the removable parts may be readily effected, as it is only necessary to loosen the three screws 13 to permit the sections to be lifted off, and these screws are accessible from the outer side of the vehicle body.

What I claim as new is:

1. A vehicle body comprising a base frame having side and back bars and sockets therein, separate side and rear body sections mounted on said frame and having posts the lower ends of which fit in said sockets, clamping bars extending along the inner sides of said side and back bars and engageable with the inner sides of the ends of said posts to hold them in the sockets, and means accessible at the outer sides of the frame to clamp said clamping bars against the posts.

2. A vehicle body comprising a base frame, a fixed front frame having posts with sockets in the top thereof, removable body sections mounted on the base frame behind said front frame, the said sections having posts at the front ends thereof with a hooked part engaging in said sockets, and means to fasten said sections to the base frame.

3. A vehicle body comprising a base frame with side and rear sockets, a fixed front seat frame thereon, and removable side and rear body sections each of which has posts fitting in said sockets, the posts of each side section being located on opposite sides of the doorway and the post at the front side of the doorway being attached to the said front frame.

In testimony whereof, I do affix my signature in presence of two witnesses.

JOHN HAMMEL.

Witnesses:
JOHN A. BOMMHARDT,
J. R. DAVIS.

Copies of this patent may be obtained for five cents each, by addressing the "Commissioner of Patents, Washington, D. C."